(12) United States Patent
Hansen

(10) Patent No.: US 9,040,005 B2
(45) Date of Patent: May 26, 2015

(54) SCRUBBER SYSTEM AND METHOD

(75) Inventor: Jens Peter Hansen, Aalborg (DK)

(73) Assignee: ALFA LAVAL CORPORATE AB, Lund (SE)

( * ) Notice: Subject to any disclaimer, the term of this patent is extended or adjusted under 35 U.S.C. 154(b) by 0 days.

(21) Appl. No.: 14/348,392

(22) PCT Filed: Sep. 12, 2012

(86) PCT No.: PCT/EP2012/067812
§ 371 (c)(1),
(2), (4) Date: Apr. 24, 2014

(87) PCT Pub. No.: WO2013/045272
PCT Pub. Date: Apr. 4, 2013

(65) Prior Publication Data
US 2014/0248201 A1  Sep. 4, 2014

(30) Foreign Application Priority Data

Sep. 30, 2011  (EP) ..................... 11183416

(51) Int. Cl.
*B01D 53/50* (2006.01)
*B01D 53/78* (2006.01)
(Continued)

(52) U.S. Cl.
CPC ............... *B01D 53/92* (2013.01); *B01D 47/00* (2013.01); *B01D 53/1481* (2013.01);
(Continued)

(58) Field of Classification Search
CPC ......... B01D 53/50; B01D 53/78; B01D 53/92
USPC ................... 423/212, 242.1, 243.01, 243.08; 422/168, 169, 170
See application file for complete search history.

(56) References Cited

U.S. PATENT DOCUMENTS 5,657,630 A      8/1997  Kjemtrup et al.
2008/0044335 A1*  2/2008  Anttila et al. ............ 423/243.01
(Continued)

FOREIGN PATENT DOCUMENTS

EP    1 857 169 A1    11/2007
WO    WO 2007/054615 A1    5/2007
(Continued)

OTHER PUBLICATIONS

International Search Report (PCT/ISA/210) mailed on Nov. 27, 2012, by the European Patent Office as the International Searching Authority for International Application No. PCT/EP2012/067812.
(Continued)

*Primary Examiner* — Timothy Vanoy
(74) *Attorney, Agent, or Firm* — Buchanan Ingersoll & Rooney PC

(57) ABSTRACT

The present invention relates to a method for removal of $SO_2$ from exhaust gas from a marine engine or a marine boiler of a ship. The exhaust gas from said marine engine or marine boiler is cooled and washed with seawater in a first scrubber section, and subsequently, in a second scrubber section, washed with circulating freshwater with an addition of an alkaline chemical. The circulating freshwater used for washing is warmer than the seawater used for cooling in the first scrubber section. The warmer freshwater is indirectly heat exchanged with cold seawater. The exhaust gas washed in the first scrubber section is passed via a demister unit before it is washed with circulating freshwater in the second scrubber section. The invention further relates to a corresponding scrubber system.

7 Claims, 1 Drawing Sheet

(51) Int. Cl.
*B01D 53/92* (2006.01)
*B01D 47/00* (2006.01)
*B01D 53/14* (2006.01)
*B01D 53/75* (2006.01)
*F01N 3/04* (2006.01)
*F01N 13/00* (2010.01)

(52) U.S. Cl.
CPC ........... *B01D 53/502* (2013.01); *B01D 53/504* (2013.01); *B01D 53/75* (2013.01); *B01D 2251/304* (2013.01); *B01D 2251/604* (2013.01); *B01D 2251/606* (2013.01); *B01D 2252/103* (2013.01); *B01D 2252/1035* (2013.01); *B01D 2257/302* (2013.01); *B01D 2257/60* (2013.01); *B01D 2258/0283* (2013.01); *B01D 2259/4566* (2013.01); *F01N 3/04* (2013.01); *F01N 13/004* (2013.01); *F01N 2570/04* (2013.01); *F01N 2590/02* (2013.01); *Y02T 10/20* (2013.01); *B01D 2247/04* (2013.01); *B01D 2247/107* (2013.01)

(56) References Cited

U.S. PATENT DOCUMENTS

2011/0168540 A1    7/2011    Klausner et al.
2012/0312166 A1    12/2012   Theis et al.
2013/0315811 A1*   11/2013   Peng ..................... 423/243.08

FOREIGN PATENT DOCUMENTS

| WO | WO 2008/015487 A1 | 2/2008 |
| WO | WO 2010/027938 A2 | 3/2010 |
| WO | 2011/085908 A1 | 7/2011 |
| WO | 2012/113977 A1 | 8/2012 |

OTHER PUBLICATIONS

Written Opinion (PCT/ISA/237) mailed on Nov. 27, 2012, by the European Patent Office as the International Searching Authority for International Application No. PCT/EP2012/067812.

Anders Andreasen et al., "Use of Seawater Scrubbing for $SO_2$ Removal from Marine Engine Exhaust Gas," Energy & Fuels, vol. 21, No. 6, 2007.

* cited by examiner

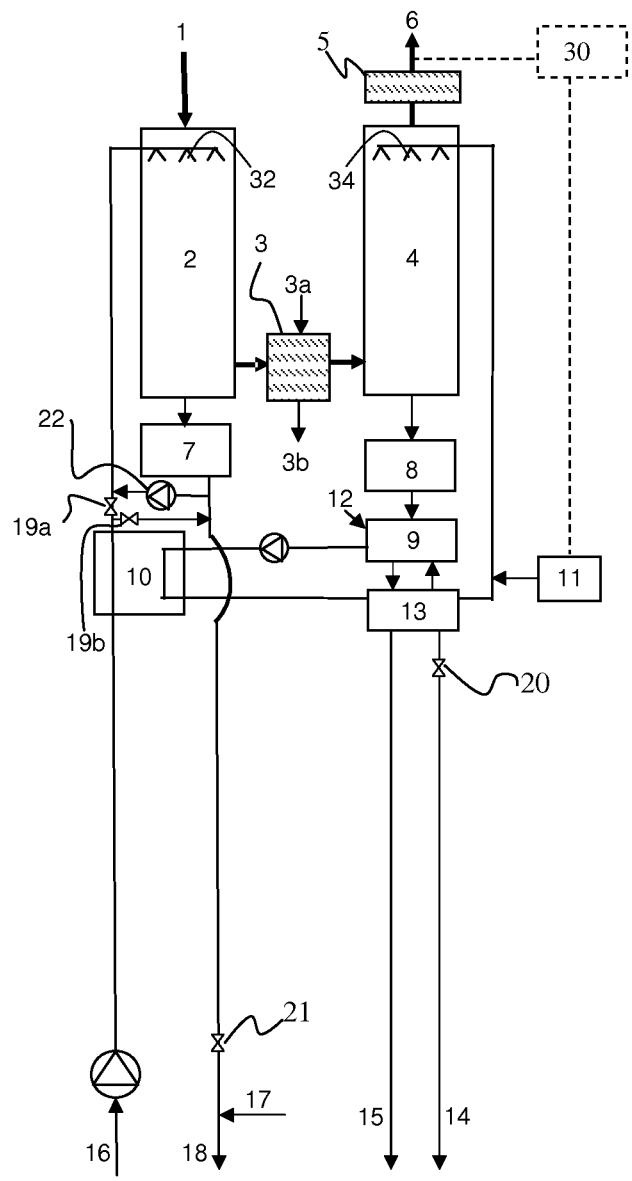

SCRUBBER SYSTEM AND METHOD

TECHNICAL FIELD

The invention relates to removal of constituents from waste gas and in particular to a system and a method for removing sulphur dioxide ($SO_2$) and particulate matters, such as soot, oil and heavy metals from marine engine exhaust gases.

BACKGROUND OF THE INVENTION

Fossil fuels contain sulphur, which during combustion forms gaseous sulphur oxides, $SO_x$. The amount of $SO_x$ in fuel exhausts vary according to natural differences in the sulphur content of fuels. The dominant constituent, making up more than 95% of the $SO_x$ emission from combustion of fossil fuel, is sulphur dioxide, $SO_2$. $SO_2$ is a toxic gas, directly harmful for both fauna and flora. A secondary effect of $SO_2$ emission to the atmosphere is formation of sulphate aerosols and a third well recognized result of $SO_2$ emissions is acid rain.

To meet existing and upcoming regulations on reduced sulphur oxide emissions, the use of fuel with low sulphur content is an option. However, there is limited availability of natural low sulphur fuels and the refinery process for desulphurization is costly and energy demanding. A potential sustainable alternative to the use of low sulphur fuels is removal of constituents from the exhaust gas after the combustion process.

Due to legislative requirements, certain Flue Gas Desulphurization (FGD) or scrubber techniques are being adapted from their usual land-based applications to marine applications. So-called exhaust gas scrubbers or just scrubbers seem promising for applications onboard ships. Some well-known scrubbing techniques are shortly described below.

Limestone

Wet scrubbers are well-know from especially coal fired power and cement plants where they have been a preferred solution to remove $SO_2$ from flue gasses for decades. The flue gas is usually cleaned by circulating slurry of water and limestone under the formation of gypsum, which is collected and dewatered. A large part of the gypsum is sold and used as e.g. filler in Portland cement. $SO_2$ removal efficiencies exceeding 98% are typical in these applications. The chemical reactions taking place can formally be written as follows:

$$SO_2(g)+CaCO_3(s)+\tfrac{1}{2}O_2(g) \rightarrow CaSO_4(s)+CO_2(g) \qquad (1)$$

Coal dust particles are usually collected in an electrostatic filter or bag filter prior to the scrubbing process, whereby contamination of the slurry and thereby the final gypsum product is avoided. Again, due to the need of particle filters and storage and handling of the powdered limestone reactant and gypsum product, usual scrubbing with limestone is considered inappropriate onboard ships.

Fresh Water with Addition of Sodium Hydroxide

In other land-based installations, aqueous sodium hydroxide is used as an alkaline neutralizing agent instead of the limestone:

$$SO_2(g)+2NaOH(aq)+\tfrac{1}{2}O_2(g) \rightarrow 2Na^{+}+SO_4^{--}+H_2O \qquad (2)$$

The sodium sulfate formed is usually dissociated in the discharge water from the scrubber. From a process point of view, it is easier to use aqueous sodium hydroxide than limestone because handling of the limestone and gypsum powders are avoided. However, the applications are limited to smaller installations because of the costs of the sodium hydroxide. Sodium carbonate ($Na_2CO_3$) or sodium bicarbonate ($NaHCO_3$) could however be used as cheaper alternatives. Another major disadvantage for usage onboard a ship is that, depending on the conditions, a large amount of freshwater will be required. However the availability of freshwater is usually limited onboard a ship.

Seawater

It is known technology to treat waste gases with seawater. The pH of surface seawater usually ranges from 8.1 to 8.9. Using this natural alkalinity to neutralize absorbed sulphur dioxide is well-known from Inert Gas Systems (IGS) onboard ships but also from several land-based installations. IGS have been supplied for more than 40 years to the tanker industry and seawater scrubbers are today an integrated part in many of these systems. With absorption in seawater, the $SO_2$ will mainly end as bisulfite and sulfate in the water, according to the following reactions:

$$SO_2(g) \leftrightarrow SO_2(aq) \qquad (3)$$

$$SO_2(aq)+H_2O \leftrightarrow HSO_3^{-}+H^{+} \qquad (4)$$

$$HSO_3^{-}+O_2(aq) \rightarrow SO_4^{--}+H^{+} \qquad (5)$$

The hydrogen ions then "push" to the natural carbonate balance in the water as follows:

$$H^{+}CO_3^{--} \leftrightarrow HCO_3^{-} \qquad (6)$$

$$H^{1}+HCO_3^{-} \leftrightarrow H_2CO_3 \qquad (7)$$

$$H_2CO_3 \leftrightarrow H_2O+CO_2(g) \qquad (8)$$

The net result is formation of sulfate ions in the water and gaseous carbon dioxide, which is released to the atmosphere. The amount of the carbonate ($CO_3^{--}$) and bicarbonate ($HCO_3^{-}$) ions as well as other minor anions to react with hydrogen cations determine the so-called alkalinity or buffering capacity, which in turn is a measure of the amount of $SO_2$, which can be absorbed in the water. The obvious advantage of using seawater instead of freshwater is that no neutralization chemicals, like NaOH or $Na_2CO_3$, are required onboard the ship. The main disadvantage is that a very high water flow is required due to a limited seawater alkalinity and that seawater is relatively corrosive, whereby the costs of the scrubber construction material increases.

Adoption of Scrubbers to Marine Applications

Another challenge for the adoption of land-based scrubbers to marine applications is the changing legislative requirements and also changing conditions when a ship sails through different waters. So-called Emission Control Areas (ECA) have been established with more strict $SO_2$ emission levels. From 2015, ships are not allowed to emit more $SO_2$ than corresponding to 0.1% sulphur in the fuel oil within emission controlled areas. Outside emission controlled areas, the limit is 3.5% sulphur until 2020 and 0.5% sulphur after 2020. Contrary to land-based installations, this means that a scrubber must be much more efficient when a ship enters an emission controlled area as well as that adjustments must be implemented to cope with changing seawater alkalinity (in case of a seawater scrubber), seawater temperature and engine load.

Once a scrubber system has been installed onboard a ship, only limited degrees of freedom are left for adjusting the operation of the scrubber to comply with the changing legislative requirements and changing ambient conditions. An option is of course to over-dimension the size of the scrubber and the water system to thereby be able to fulfill the required efficiency even under the worst possible conditions. Examples of such possible conditions are high engine load, high fuel sulfur content, lower water alkalinity, ship in emission controlled areas and extremely low water temperature. This is however not an attractive solution as these circumstances will only occur rarely and add costs to the investment in the scrubber system and also increase the operational costs under normal sailing conditions. Normal sailing conditions typically involve e.g. 40-80% engine load, 2.3% fuel sulfur content, a seawater alkalinity on 2200 μmol/kg, and a seawater temperature between 5-15° C., In many situations, it will even be impossible to retrofit an over-dimensioned scrubber system onboard an existing ship due to very limited space available.

WO 2007/054615 describes a seawater scrubber system applicable for marine use. According to this prior art, it is suggested to reduce the amount of required seawater in the scrubber by concentrating the seawater by reverse osmosis. The fresh water also produced by the reverse osmosis can be applied for $NO_x$ reduction in the engine or for other purposes onboard the ship.

WO 2008/015487 describes a freshwater scrubber system applicable for marine use. According to this prior art, a specially designed condensational scrubber is disclosed with the aim to improve particulate matter removal efficiency and to avoid the necessity of exhaust gas reheat after the scrubber.

EP 1857169A1 also describes a freshwater scrubber system applicable for marine use. In one embodiment, a two section scrubber is suggested. The first section is for sulfur removal and the second section is for condensation, whereby the overall water consumption is reduced. In this case both sections are operated on fresh water with an addition of caustic soda. The idea of creating clean freshwater in a later condensational stage has also been suggested and disclosed in U.S. Pat. No. 5,657,630.

WO 2010/027938A2 describes a scrubber intended for cleaning flue gases from land based plants, especially metal smelting operations. The scrubber consists of two stages, a first sulfur removal stage operating on seawater and a second water condensational stage for generating freshwater.

Further, a wet scrubber was installed by Aalborg Industries A/S (Alfa Laval Aalborg A/S since May 2011) onboard a ship and has been in operation since June 2010. This scrubber is the first scrubber in the world installed after a ships main engine (21 MW MAN 2-stroke). The scrubber is called a hybrid scrubber because it has the unique possibility to operate in either a seawater mode or in a freshwater mode. The scrubber also comprises two sections. In the first section, the exhaust gas is cooled and cleaned by spraying in water in a downward flow parallel to the exhaust gas. In the second section, the exhaust gas is further cooled and cleaned by passing upwards through high surface fillings elements in a flow counter current to the downwardly sprayed water flow. A general description of Aalborg Industries proto-type scrubber system has been published on several conferences.

In the wet scrubber installed by Aalborg Industries A/S, an efficient $SO_2$ removal has been found in the first jet sprayer section when operated in seawater mode. This can be explained by the fact that the $SO_2$ concentration in the gas phase, which is the driving force for the absorption reaction, is relative high in the first section. In the second absorption section, a large amount of seawater is however necessary in order to remove the remaining $SO_2$ and comply with the strictest legislation on 0.1% sulfur equivalents ($S_{EQ}$). With the installation made by Alborg Industries A/S, the sulfur emission after the scrubber is usually between 0.1-0.3% $S_{EQ}$ when the engine is operated at full load (21 MW) and when the pump supplying seawater to both sections is working at maximum (1000 m³/h).

In freshwater mode, it is not a problem to comply with the strict 0.1% $S_{EQ}$ limit. A bad $SO_2$ absorption efficiency has been found when starting up on clean freshwater but the efficiency increases significantly when the water has been re-circulated for approximately 10-30 minutes. This can be explained by the fact that also a fast reacting bicarbonate buffer builds up in the water. Beside $SO_2$ also carbon dioxide, $CO_2$, is absorbed from the engine exhaust gas. This $CO_2$ will also react with the added caustic soda:

$$CO_2(g)+OH^-\to HCO_3^- \qquad (9)$$

Because most of the water is circulated back to the scrubber, the formed bicarbonate ($HCO_3^-$) will get another chance to react with $SO_2$:

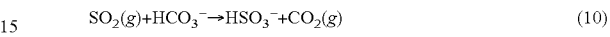

$$SO_2(g)+HCO_3^-\to HSO_3^-+CO_2(g) \qquad (10)$$

After a certain time of operation, a bicarbonate buffer will thereby build up in the thus circulated water. This bicarbonate buffer will cause the liquid to maintain a high pH during the entire $SO_2$ absorption process and thereby improve the overall $SO_2$ absorption efficiency.

In practice it has been found difficult to suddenly switch over from seawater mode to freshwater mode because some seawater will enter the freshwater system or because contaminated freshwater will be discharged to the sea.

SUMMARY

It is the object of the present invention to provide an improved method and a corresponding system for removal of $SO_2$ from a marine engine or a marine boiler.

According to a first aspect, a method for removal of $SO_2$ from exhaust gas from a marine engine or a marine boiler of a ship is provided. The method is characterized in that the exhaust gas from said marine engine or marine boiler in a first scrubber section is cooled and washed with seawater, and subsequently in a second scrubber section is washed with circulating freshwater with an addition of an alkaline chemical, the circulating freshwater used for washing being warmer than the seawater used for cooling, and wherein the warmer freshwater is indirectly heat exchanged with cold seawater.

The method further comprises passing the exhaust gas washed in the first scrubber section via a demister unit before it is washed with circulating freshwater in the second scrubber section.

As will be described in details below, the second scrubber section using freshwater improves removal of the last and difficult amount of sulfur oxide, which under some circumstances have shown to be difficult to remove in the first scrubber section using seawater. This is made by adding the alkaline chemical in the second scrubber section. In the first scrubber section, the exhaust gas from the marine engine or the marine boiler is rapidly cooled down from about 180-250° C. to about 45-55° C. while simultaneously a part of the $SO_2$ contained in the exhaust gas is "washed away" by the seawater by reacting with the seawater in line with equations (3)-(8) discussed above. During the cooling, the volume of the exhaust gas is reduced, allowing the second scrubber section to be given smaller dimensions than otherwise required. This facilitates retro-fitting installations. The thus partially washed exhaust gas is further washed while passing the second scrubber section. In the second scrubber section, $SO_2$ is removed from the exhaust gas by the $SO_2$ reacting with the alkaline chemical according to the above equation (2). Particulate matter such as soot, oil and heavy metals is washed away by the freshwater.

During the passage through the second scrubber section, a bicarbonate buffer is created in the circulating freshwater, allowing the circulated freshwater to maintain a pH higher than 5.5 in the entire second scrubber section, whereby the overall $SO_2$ absorption efficiency may be improved. Reference is made to equation (10) given above describing the reaction between the bicarbonate and the $SO_2$.

In order to condense as much water as possible in the second fresh water section, the circulating fresh water is heat exchanged with cold seawater supplied to the first section. The cold sea water used for heat exchanging may be the same seawater supplied to the first scrubber section or a separate supply of cold seawater provided for that particular purpose. The temperature of the cold seawater supplied to the heat exchanger will be close to the temperature of the ambient seawater and will thus always be colder than the circulating freshwater. The main advantage of cooling and condensing water in the second scrubber section is to lower the content of water vapor in the cleaned exhaust gas to the atmosphere whereby the plume visibility is decreased and whereby the overall consumption of fresh water to the scrubber system is reduced or turned into a net water generation. If both scrubber sections had been fed with circulating fresh water, a much larger flow of seawater would have been required for the cooling and this seawater would just have been discharged again without having been utilized in the scrubbing process.

The warmer freshwater is indirectly heat exchanged with the cold seawater. By indirect heat exchanged is meant that no intermixing of the two fluid take place. It has been found that warm seawater is slightly more efficient in terms of removal of $SO_2$ than cold seawater during seawater mode operation. Trials have shown that about 94% $SO_2$ removal efficiency is obtained with seawater having a temperature of 16° C. but this drops to about 90% when the seawater temperature decreases to about 8° C. This finding is surprisingly the opposite of what a person skilled in the art would predict (e.g. Andresen A., Mayer S. "Use of Seawater Scrubbing for $SO_2$ removal from Marine Engine Exhaust Gas", Energy & Fuels 21 (6), 2007). Normally, the overall $SO_2$ absorption efficiency is controlled by the absorption rate from the gas to the liquid phase while the reaction within the liquid is considered to occur instantaneously. The absorption efficiency is therefore normally enhanced by a low vapor pressure and hence low temperature. However, in the present case, with very limited residence time of the liquid in the scrubber and with very cold seawater in winter periods, the overall absorption efficiency is no longer solely controlled by the gas to liquid phase absorption but also by the chemical reaction, see equations (3) to (8) that must take place in the liquid seawater. The later chemical reaction rate decreases with decreasing temperature.

In that the method comprises the step of passing the exhaust gas washed in the first scrubber section via a demister unit before it is washed with circulating freshwater in the second scrubber section, seawater droplets and seawater salt are prevented from entering the second scrubber section. The demister unit may, as a result of the desalting effect, provide an addition of freshwater to the circulating freshwater of the second scrubber system. This is advantageous since freshwater often is a scarce commodity onboard a ship.

The supply of seawater to the first scrubber section may be temporarily stopped. or reduced, while continuing washing the exhaust gas with circulating freshwater in the second scrubber section.

The method may further comprise the step of cleaning the circulating freshwater in a water cleaning unit before being discharged. Besides $SO_2$, also particulate matter such as soot particles, oil and heavy metals are absorbed in the water. The water cleaning unit may clean the freshwater prior to further circulation through the second scrubber. It may also clean the freshwater before discharge to thereby comply with relevant legislation regarding water discharge criteria. Sludge comprising particulate matter from the water cleaning unit may be collected onboard and disposed to adequate facilities when the ship is in port. The water cleaning unit may by way of example be a centrifuge or filters. It is however to be understood that other water cleaning methods are applicable. It is however only possible to clean the discharge water in freshwater mode because the flow of seawater is too high. Typically, in seawater mode, the discharge flow is about 50 $m^3$/MWh while typically only 0.05-0.5 $m^3$/MWh in freshwater mode.

The alkaline chemical may be sodium hydroxide (NaOH), sodium carbonate ($Na_2CO_3$) or sodium bicarbonate ($NaHCO_3$). It is to be understood that these are non-limiting examples of suitable alkaline chemicals.

According to a second aspect of the invention there is provided a scrubber system for removal of $SO_2$ from exhaust gas from a marine engine or a marine boiler of a ship. The scrubber system comprises a heat exchanger and a first scrubber section arranged in communication with a second scrubber section, wherein exhaust gas from said marine engine or marine boiler is arranged to be supplied to the first scrubber section to be cooled and washed with seawater to be supplied to the first scrubber section, and wherein the thus washed and cooled exhaust gas is arranged to be supplied to the second scrubber section to be washed with circulating freshwater with an addition of an alkaline chemical to be supplied to the second scrubber section, the circulating freshwater used for washing being warmer than the seawater used for cooling, and wherein the warmer freshwater is arranged to be indirectly heat exchanged with cold seawater by the heat exchanger. The system further comprises a demister unit through which the exhaust gas washed in the first scrubber section is arranged to be passed before it is washed with circulating freshwater in the second scrubber section. The system comprises essentially the same features as the previously discussed method. To avoid undue repetition in terms of the advantages, reference is made to the section discussing the method.

By the demister unit, salt particles from the seawater are prevented from entering the second scrubber section together with the exhaust gas.

The scrubber system may further comprise a plurality of valves, whereby the supply of seawater to the first scrubber section may be temporarily stopped or reduced by said valves during continued washing of the exhaust gas with circulating freshwater in the second scrubber section.

The demister unit may be arranged between the outlet of the first scrubber section and the inlet of the second scrubbers section. Other objectives, features, aspects and advantages of the invention will appear from the following detailed description as well as from the drawing.

BRIEF DESCRIPTION OF THE DRAWING

The invention will be better understood with reference to the following detailed description of an embodiment of the invention in conjunction with the attached figure.

FIG. 1 shows a scrubber system according to an embodiment of the invention.

DETAILED DESCRIPTION OF THE INVENTION

In the following one embodiment of a scrubber system in line with the invention will be discussed with reference to FIG. 1.

The scrubber system is based on a scrubber comprising a first scrubber section 2 and a second scrubber section 4. A demister unit 3 is arranged between the outlet of the first scrubber section 2 and the inlet of the second scrubber section 4. As a non-limiting example, the first scrubber section 2 may be a scrubber section of the sprayer type, well known in the art, and the second scrubber section 4 may be a packed bed type scrubber section, also well known in the art. It is however to be understood that other types of scrubbers sections or scrubber systems are possible and that the invention should not be limited to these examples. It is also to be understood that a scrubber section may consist of several stages in serial which together provides the same overall functionality as one scrubber section could have done. The intended functionality of a scrubber section should be understood from the context of the below description.

The first scrubber section 2 is arranged in communication with a marine engine or a marine boiler (not disclosed) of a ship to receive exhaust gas 1 therefrom. The exhaust gas 1 received from the marine engine or the marine boiler is fed into the first scrubber section 2 at an upper end thereof to be washed with a flow of seawater. The first scrubber section 2 is supplied with the seawater entering the first scrubber section 2 essentially at the top thereof via nozzles 32. The seawater 16 may be supplied directly from the sea. Under normal operation, all seawater leaving the first scrubber section 2 from a lower end thereof is passed through a degassing unit 7 and discharged through a valve 21. In the degassing unit 7 any remaining gas bubbles are removed.

The main purpose of the first scrubber section 2 is to quickly lower the temperature of the exhaust gas received from the marine engine or the marine boiler from a temperature of about 180-250° C. to a temperature range of about 45-60° C. By the decreased temperature the volume of the exhaust gas is reduced, whereby the second scrubber section 4, to be explained below, may be given smaller dimensions. During washing in the first scrubber section 2, a removal of $SO_2$ takes place as well, whereby the consumption of alkaline chemicals is reduced in the second scrubber section 4. The washing process is a mixing or contact between the gas and the liquid. As the seawater is to be discharged directly without being cleaned, a sprayer type scrubber may be applied in the first scrubber section 2. In this, the seawater droplet size and fluid flow of gas and liquid may be optimized in order to reduce the removal of soot particles from the exhaust gas while still absorbing as much sulphur dioxide as possible.

The thus washed exhaust gas is fed into the second scrubber section 4 via the demister unit 3. In the demister unit 3, droplets of evaporated seawater are separated from the exhaust gas after which the exhaust gas is washed again in the second scrubber section 4 with freshwater containing an alkaline neutralizing agent. More precisely, the exhaust gas is entering the second scrubber section 4 via an inlet arranged in a lower end thereof and meets the counter flow of freshwater ejected into the second scrubber section 4 from an upper end thereof via nozzles 34 before leaving the second scrubber section 4 via a gas outlet at the upper end thereof. The freshwater out of the second scrubber section has a temperature within the range of 30-60° C., in the following identified as a second temperature range. As the fresh water is cleaned for soot particles before being discharged, a gas absorption type and/or an impact type scrubber well-known by the skilled person is preferably applied in the second scrubber section 4. In the gas absorption type scrubber, the removal of soot particles is optimized by diffusion, requiring a large surface area and long contact time. In the impact type scrubber, the soot particles are mainly removed by condensational growth followed by the use of kinetic energy, i.e. high water speed or high gas speed.

When the thus cleaned exhaust gas leaves the second scrubber section 4 at the upper end thereof; droplets of evaporated freshwater are separated from the washed exhaust gas in a demister unit 5. The thus washed and clean exhaust gas 6 is emitted to the atmosphere.

The second scrubber section 4 is connected to a freshwater circulation system comprising a circulation tank 9, a water cleaning unit 13 and a heat exchanger 10. More precisely, the freshwater leaving the second scrubber section 4 via a lower end thereof is degassed in a degassing unit 8 to remove gas bubbles passed through the circulation tank 9 used as a reservoir and then pumped through the heat exchanger 10 to remove soot particles and possible oily residues from the water, before being fed to the water cleaning unit 13 from which it may be either discharged as illustrated by reference number 14, fed back into the circulation tank 9 or fed back into the second scrubber section 4. Before the freshwater is pumped back into the second scrubber section 4 to the top end thereof via the nozzles 34 it is neutralized by an addition of an alkaline chemical 11. The alkaline chemical may by way of example be sodium hydroxide (NaOH), sodium carbonate ($Na_2CO_3$) or sodium bicarbonate ($NaHCO_3$). It is to be understood that these are non-limiting examples of suitable alkaline chemicals. The circulating water should have pH between 6 and 9 after addition of the alkaline chemical.

The water cleaning unit 13 will keep the circulating freshwater clean of particulate matter for proper operation of the second scrubber section 4 and for discharge of the cleaned water 14 according to relevant legislative requirements. The water cleaning unit may by way of example be a high speed separator. High speed separators and water cleaning units in general are well known to the skilled person whereby no further explanation is required. The water cleaning unit 13 is also arranged to clean freshwater to be discharged 14 for it to comply with relevant legislation regarding water discharge. Sludge 15 in the form of particulate matter and water separated by the water cleaning unit 13 may be collected onboard and disposed to adequate facilities when the ship is in port.

The heat exchanger 10 is fed with the freshwater from the second scrubber section 4 and cold seawater 16 from the ambient sea. It is to be understood that the seawater used in the first scrubber section 2 may be used as well. An indirect heat exchanger, preferably a plate type heat exchanger, may be applied whereby heat is transferred from the circulated freshwater to the seawater. By the term indirect heat exchanger is meant a heat exchanger wherein the two fluids used are not in direct contact with each other.

A valve 19a arranged between the heat exchanger 10 and the first scrubber section 2 may be open under normal operation so that all the seawater is introduced to the first scrubber section 2. After having passed the first scrubber section 2, the seawater is degassed in degassing unit 7. If the seawater out of the first scrubber section 2 is not fully saturated with sulphur and if the scrubber is positioned at a high position relative to the seawater level, it will be an advantage to circulate a part of it by means of a pump 22 to the top of the first scrubber section 2. The remaining part may be discharged into the sea through the overboard discharge pipe 18. The pH value of the seawater to be discharged from the degassing unit 7 may be controlled by diluting the same by supplying a portion of cold seawater via a valve 19b arranged in a pipe connecting the outlet of the heat exchanger 10 with the outlet of the degassing unit 7. Alternatively, the pH value of the seawater to be discharged from the degassing unit 7 may be controlled by dilution with clean seawater 17 before being discharged as flow 18.

The degassing unit 7 and the degassing unit 8 are connected to the first and second scrubber sections 2, 4 whereby the gas bubbles are released together with the flow of exhaust gas 6. Physically, the degassing function may also be integrated parts in the first and second scrubber sections 2 and 4. Alternatively, the second scrubber section 4, the degassing unit 8 and the circulation tank 9 may be integrated parts—typically by having a reservoir of liquid in the bottom of the scrubber.

In special sensitive areas, where it might not be allowed to discharge acidified water from the scrubber system, the valve 19a may be closed and the second scrubber section 4 must then continue in freshwater mode. The valve 20 may also be closed in order to operate the scrubber in a complete closed loop for a limited period. Depending on the heat resistance of the scrubber system, it might be necessary to add a small amount of cooling water to the first scrubber section 2 or to another (non-disclosed) cooling unit as the main seawater flow is bypassed this section. However, this will only be a very limited amount of water because the energy removed from the exhaust gas is not only used for heating the water but for a complete evaporation of the water. If there is sufficient freshwater available onboard, this may preferably applied for this purpose and the part, which might not evaporate could be fed to the circulation tank 9. If the availability of pure freshwater is limited onboard, a minor amount of seawater is allowed to pass valve 19a and the salt concentrate not evaporated in the first scrubber section 2 could be accumulated in the degassing unit 7, accumulated elsewhere, used for other purposes, or it could be neutralized, cleaned and discharged (not disclosed on FIG. 1).

In case the valve 19b is open, a valve 21 arranged between the outlet of the degassing unit 7 and the overboard discharge pipe 18 should be controlled so that air in the seawater discharge pipe is eliminated. If the pipe is filled with water instead of pressurized air it is possible to create a suction at the seawater outlet of the plate heat exchanger, whereby the energy for supplying cold seawater 16 up to the heat exchanger 10 is minimized.

Another possibility with the scrubber system shown in FIG. 1 is to compensate for the decreasing seawater alkalinity, for example when a ship sails into the Baltic Sea having a different salt level. In such a scenario, the seawater alkalinity will slowly decrease and the inlet $SO_2$ concentration to the second scrubber section 4 will slowly start to increase correspondingly. However, this is accounted for by aid of a controller 30 that may get the $SO_2$ concentration in the washed exhaust gas 6 to be emitted as input signal and which then gradually may increase the dosing of the alkaline chemical 11 into the circulating freshwater loop. The controller 30 may receive information about the $SO_2$ concentration in the exhaust gas 6 by a sensor arrangement (not disclosed) at the outlet of the second scrubber section 4 after the demister unit 5.

Referring to the previous discussion relating to equations (9) and (10), a bicarbonate buffer will be built up in the circulated water. This bicarbonate buffer will cause the liquid to maintain a high pH during the entire SO2 absorption process and thereby improve the overall SO2 absorption efficiency. To solve the potential problem of scrubbing with freshwater where no bicarbonate is present but also to make a more simplified automatic control of the dosing of alkaline, at least 20% of "old" circulated water should remain in the system if the freshwater is going to be exchanged. The freshwater needs to be exchanged before it is saturated with sodium salts. The remaining 80% of the freshwater containing sodium sulphate salts may be discharged. The discharge may be made via the water treatment system. The thus released tank volume may be refilled with clean freshwater. Because at least 20% of the old water is maintained, startup on clean fresh water without bicarbonate buffer in the water is avoided. Preferably the CO2 level in the possible void space, i.e. the space above the liquid level in the mentioned circulation tank, should be kept as high as possible in order to prevent decomposition of the bicarbonate buffer. In practice this may be done by connecting the circulation tank to the exhaust gas piping system. In this way, also possible gas released from the water in the circulation tank may be scrubbed and monitored by an existing gas analyzer before it is emitted to the atmosphere.

A benefit from the shown scrubber system is also that there may be no freshwater consumption during normal operation. The exhaust gas from the marine engine or the marine boiler will typically enter the first scrubber section 2 with a temperature on 180-250° C. and then be cooled by the seawater injected into the first scrubber section 2. A lot of seawater is thereby evaporated to the gas phase whereby the gas is getting saturated with water vapor at the entrance to the demister unit 3. This water will condense in the second scrubber section 4 and add to the volume of circulating freshwater. The amount of freshwater condensing out will increase with the efficiency of the heat exchanger 10. This freshwater may account for the loss of freshwater with the washed exhaust gas 6 and for the sulfate containing freshwater 14 being discharged through the cleaning unit 13. Means for additional cooling of the circulating freshwater may be established if the efficiency of the heat exchanger 10 is insufficient or if a colder seawater temperature to the first scrubber section 2 is required.

The main purpose of the demister unit 3 is to avoid transfer of seawater droplets from the first scrubber section 2 to the second scrubber section 4 operated with freshwater. Cleaning water 3a may be added to keep the demister unit 3 clean of particulate matter such as soot, oil and heavy metals. The cleaning water 3a as well as the seawater droplets separated out in the demister unit 3 may be discharged through an outlet 3b. Depending on the amount and composition, this water 3b may (not disclosed) be mixed with the seawater to be discharged via the overboard discharge pipe 18 or the circulating freshwater. Overall the demister unit 3 should he optimized to have a low gas pressure drop and high droplet separation efficiency. It is to be understood that vanes (not disclosed) for guiding the exhaust gas from the first scrubber section 2 to the second scrubber section 4, and especially for distributing the exhaust gas at the inlet of the second scrubber section 4, may be integrated with the droplet separation functionality of the demister unit 3.

From the description above follows that, although various embodiments of the invention have been described and shown, the invention is not restricted thereto, but may also be embodied in other ways within the scope of the subject matter defined in the following claims.

The invention claimed is:

1. A method for removal of $SO_2$ from exhaust gas from a marine engine or a marine boiler of a ship, wherein the exhaust gas from said marine engine or marine boiler in a first scrubber section is cooled and washed with seawater, and subsequently in a second scrubber section is washed with circulating freshwater with an addition of an alkaline chemical, the circulating freshwater used for washing being warmer than the seawater used for cooling, and wherein the warmer freshwater is indirectly heat exchanged with cold seawater, the method further comprising passing the exhaust gas washed in the first scrubber section via a demister unit before it is washed with circulating freshwater in the second scrubber section.

2. A method according to claim 1, wherein the supply of seawater to the first scrubber section is temporarily stopped or reduced, while continuing washing the exhaust gas with circulating freshwater in the second scrubber section.

3. A method according to claim 1, comprising the step of cleaning the circulating freshwater in a water cleaning unit before being discharged.

4. A method according to claim 1, wherein the alkaline chemical is sodium hydroxide (NaOH), sodium carbonate (Na2CO3) or sodium bicarbonate (NaHCO3).

5. A scrubber system for removal of $SO_2$ from exhaust gas from a marine engine or a marine boiler of a ship, wherein the scrubber system comprises a heat exchanger and a first scrubber section arranged in communication with a second scrubber section, wherein exhaust gas from said marine engine or marine boiler is arranged to be supplied to the first scrubber section to be cooled and washed with seawater to be supplied to the first scrubber section, and wherein the thus washed and cooled exhaust gas is arranged to be supplied to the second scrubber section to be washed with circulating freshwater with an addition of an alkaline chemical to be supplied to the second scrubber section, the circulating freshwater used for washing being warmer than the seawater used for cooling, and wherein the warmer freshwater is arranged to be indirectly heat exchanged with cold seawater by the heat exchanger, the system further comprising a demister unit through which the exhaust gas washed in the first scrubber section is arranged to be passed before it is washed with circulating freshwater in the second scrubber section.

6. Scrubber system according to claim 5, further comprising a plurality of valves, whereby the supply of seawater to the first scrubber section can be temporarily stopped or reduced by said valves during continued washing of the exhaust gas with circulating freshwater in the second scrubber section.

7. Scrubber system according to claim 5, wherein the demister unit is arranged between the outlet of the first scrubber section and the inlet of the second scrubbers section.

\* \* \* \* \*